Dec. 20, 1927.
J. METCALFE, SR
1,653,582
MINER'S BATTERY CARRYING DEVICE
Filed May 19, 1926
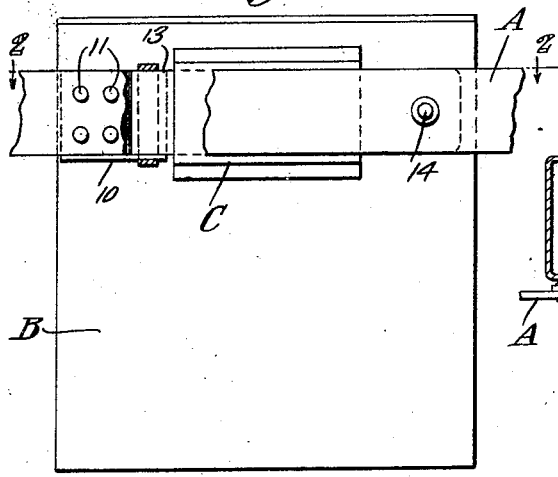
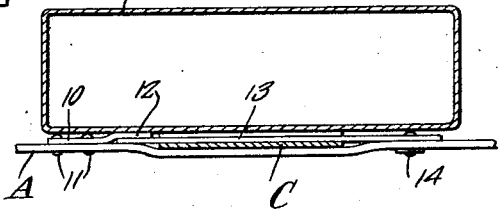
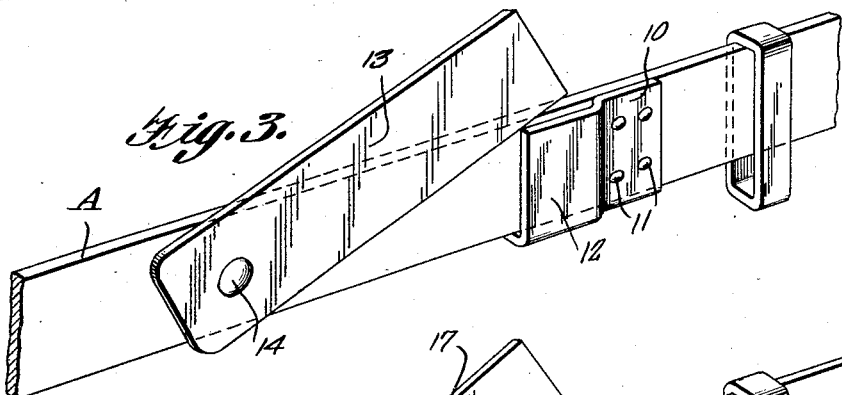
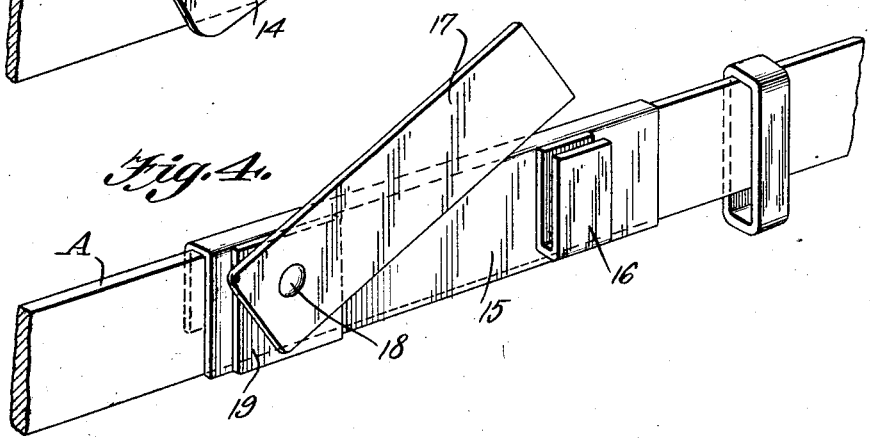
John Metcalfe, Sr.,
INVENTOR
BY Victor J. Evans
ATTORNEY
P. J. Hickey.
WITNESS:

Patented Dec. 20, 1927.

1,653,582

UNITED STATES PATENT OFFICE.

JOHN METCALFE, SR., OF VESTABURG, PENNSYLVANIA.

MINER'S BATTERY-CARRYING DEVICE.

Application filed May 19, 1926. Serial No. 110,306.

This invention relates to devices intended for use by miners and others and has for its object the provision of novel means whereby a battery, for the operation of the usual flashlight or searchlight, may be readily carried upon the belt and held firmly in the proper position without danger of its sagging down and getting in the way as well as being uncomfortable as in the case with the ordinary method.

An important and more specific object is the provision of a device adapted to be permanently mounted upon or detachably engaged upon a miner's belt and provided with means adapted to be engaged through the usual guide on a battery case whereby to support the battery case and the batteries therein in the proper position for comfort and utility.

Another object is to provide a device of this character which is so constructed and arranged that the battery case may be quickly and easily placed in position or removed, as the case may be, whenever such is desired.

An additional object is to provide a device of this character which will be simple and inexpensive in manufacture, easy to use, positive in action, efficient and durable in service, and a general improvement in the art.

With the above and other objects and advantages in view, the invention consists in the details of construction, and the arrangement and combination of elements to be hereinafter more fully described and claimed, and illustrated in the accompanying drawings, in which:—

Figure 1 is a rear elevation of a battery case showing it held in place upon a belt by means of my invention.

Figure 2 is a section taken on line 2—2 of Figure 1.

Figure 3 is a detail perspective view showing the form of the device adapted to be permanently mounted upon a belt, and Figure 4 is a detail perspective view illustrating a modified form in which the device is adapted to be hooked detachably onto a belt.

Referring more particularly to the drawings, the letter A designates a belt such as is worn by miners or others, and B designates the usual type of case within which are stored the dry cells constituting the battery used for operating the flashlight, searchlight or whatever else it may be called, or any other electrically operated accessory. It is well known that such battery cases are provided at their rear sides with horizontally extending guides C which are ordinarily engaged upon the belt A by the simple process of threading the belt through them. However, it has been discovered that when a battery is carried in this manner, it very frequently sags down into an uncomfortable position and is therefore in the way. It is to overcome these defects that I have designed the present invention.

In carrying out the form of the invention disclosed in Figures 1 and 3, I provide an angular bracket device 10 which constitutes a keeper and which is adapted to be riveted or otherwise suitably secured to the belt A as shown at 11. This keeper is shown as having an offset portion 12 which receives the free end of an arm 13 which is pivoted at 14 upon the belt as by means of a suitable rivet or the like.

Instead of using the construction shown in Figures 1 and 3, I may provide that disclosed in Figure 4. In this form of the invention, I have illustrated a channel shaped plate member, bracket or attaching device 15 which is substantially U-shaped in cross section and which is adapted to be engaged upon and over the upper edge of the belt A. Suitably secured upon this plate member 15 is a keeper 16 of U-shape which receives the free end of an arm 17 pivoted at 18 upon a plate element 19 suitably secured to the member 15.

In both forms of the invention, the operation is the same. Assuming that it is desired to mount the battery case B upon the belt A, it is merely necessary that the operator lift the arm 13 or 17, as the case may be, out of engagement with its keeper so that the guide or slide device C upon the battery case B may be engaged upon the arm 13. After this is done, it is merely necessary to release the weight of the battery or battery case whereupon the arm 13, or 17 as the case may be, will gravitationally come into engagement with the keeper therefor and the battery case will be held in the proper position with respect to the belt and will be, moreover, prevented from sagging down into a disadvantageous or uncomfortable position. In order to effect removal of the battery case, the reverse operation is followed. It is believed that the construction, operation and advantages will be readily apparent to one skilled in the art without further explanation.

While I have shown and described the preferred embodiment of the invention, it should be understood that I reserve the right to make such changes in the form, construction and arrangement of parts as will not depart from the spirit of the invention or the scope of the subjoined claims.

Having thus described my invention, I claim:—

1. In a device of the character described, a bracket member channel shaped in cross section and adapted to be engaged in inverted relation upon the upper edge of a belt, an angular keeper device carried by said bracket member, and an arm pivoted upon said bracket member for cooperation with the keeper, said arm being adapted to be engaged through a horizontally disposed guide on the back of a battery case.

2. In a device of the character described, a bracket member adapted to be mounted upon a belt, an angular keeper device carried by said bracket member, and an arm pivoted upon said bracket member for cooperation with the keeper, said arm being swingable in a plane parallel with the belt and being adapted to be engaged through a horizontally disposed guide on the back of a battery case.

JOHN METCALFE, Sr.